(12) United States Patent
Folio

(10) Patent No.: US 12,492,567 B2
(45) Date of Patent: Dec. 9, 2025

(54) HYDRAULIC VALVE

(71) Applicant: SEKO S.P.A., Cittaducale (IT)

(72) Inventor: Stefano Folio, Cittaducale (IT)

(73) Assignee: SEKO S.P.A., Cittaducale (IT)

( * ) Notice: Subject to any disclaimer, the term of this patent is extended or adjusted under 35 U.S.C. 154(b) by 76 days.

(21) Appl. No.: 18/697,041

(22) PCT Filed: Oct. 11, 2022

(86) PCT No.: PCT/IB2022/059729
§ 371 (c)(1),
(2) Date: Mar. 29, 2024

(87) PCT Pub. No.: WO2023/062526
PCT Pub. Date: Apr. 20, 2023

(65) Prior Publication Data
US 2025/0075522 A1    Mar. 6, 2025

(30) Foreign Application Priority Data
Oct. 12, 2021    (IT) .................. 102021000026159

(51) Int. Cl.
*E04H 4/12*    (2006.01)
*F16K 33/00*    (2006.01)

(52) U.S. Cl.
CPC ........... *E04H 4/1236* (2013.01); *F16K 33/00* (2013.01)

(58) Field of Classification Search
CPC ....... E04H 4/1236; F16K 33/00; F16K 31/18; E03D 1/304; E03D 1/33; E03D 1/34; E03D 1/36
USPC ........... 4/507, 395–404, 287, 295, 669, 686; 137/362; 251/295
See application file for complete search history.

(56) References Cited

U.S. PATENT DOCUMENTS

| | | | | |
|---|---|---|---|---|
| 1,501,620 A | * | 7/1924 | Reed .................. | E03D 3/10 4/357 |
| 1,553,616 A | * | 9/1925 | Johnson ................ | E03D 1/34 4/396 |
| 2,800,664 A | * | 7/1957 | Bridge ................. | E03D 1/304 4/407 |

(Continued)

FOREIGN PATENT DOCUMENTS

FR    1463726 A    12/1966

OTHER PUBLICATIONS

International Search Report from International Application No. PCT/IB2022/059729 mailed Nov. 21, 2022.

*Primary Examiner* — Tuan N Nguyen
(74) *Attorney, Agent, or Firm* — Shih IP Law Group, PLLC

(57) ABSTRACT

A hydraulic valve engages a through opening delimited through a bottom wall of a tank for a liquid and comprises a cage element connected inside the bottom wall, a shutter movably housed in the cage element, a hollow connection element which hermetically engages the through opening delimiting a passage that passes through the hydraulic valve, wherein the hollow connecting element comprises an engagement portion which extends into the through opening and defines a passage opening selectively occludable by means of a shutter as a function of the quantity of liquid in the tank, wherein the hollow connecting element comprises radial notches which define respective passages for a liquid sucked out of the tank through which the formation of a vortex is prevented and the sucking in air.

11 Claims, 4 Drawing Sheets

(56) References Cited

U.S. PATENT DOCUMENTS

| | | | |
|---|---|---|---|
| 3,418,789 A | | 12/1968 | Hoffman et al. |
| 4,499,615 A | * | 2/1985 | Radovsky .................. E03D 1/36 |
| | | | 4/398 |
| 6,408,452 B1 | | 6/2002 | Bromley |
| 2010/0071123 A1 | | 3/2010 | Larsen |

* cited by examiner

HYDRAULIC VALVE

The present invention relates to a hydraulic valve that can be used in a tank to selectively intercept a delivery opening delimited at a bottom wall of the tank as a function of the level of liquid contained in the tank itself.

In the following description, reference will be made to an implementation of the hydraulic valve according to the invention inside a tank containing a solution saturated with chlorine to be withdrawn, by suction, in order to then be able to mix it with a flow of water that is delivered along a swimming pool system, to check the chlorine content in the pool water.

It is understood that the hydraulic valve according to the invention can be used in alternative sectors with respect to the one indicated above, while providing for its use inside a tank or container in which a liquid is contained.

As is known, in a swimming facility the use of chlorine to be dissolved in water for hygiene reasons is envisaged. Chlorine, in fact, is an oxidizing and disinfectant substance and is highly effective against numerous pathogens that can spread in water. However, chlorine is a very irritating substance if inhaled or if it comes into contact with the skin and, for this reason, its concentration in the water must be kept within a predetermined range, in order to ensure correct disinfectant action without causing irritation.

The chlorine concentration varies over time and, as far as possible, must be kept constant and within the aforementioned range.

For this reason it is known to use devices to mix a saturated chlorine solution within a system in which water drawn from a swimming pool is circulated and reintroduced into the pool itself after being mixed with the chlorine solution.

These devices provide for sucking a saturated chlorine solution contained in a tank, feeding it into the flow of water that is pumped into the pool.

The tank is cyclically emptied to avoid the presence of deposits inside it and during the final stages of emptying it may happen that together with the chlorine saturated solution, air is sucked into the water pumped towards the pool, releasing bubbles inside the pool itself.

Inside the bubbles, in addition to the air, there is chlorine which when released into the atmosphere can have a higher concentration than that of the solution dissolved in water, causing irritation.

The use of a float valve to selectively intercept a tank outlet is known.

In general, such a float valve engages an opening which is delimited at a bottom of a tank and comprises a float selectively movable inside the valve relative to a discharge duct which extends through the valve itself and engages the through opening of the tank. The float is movable between an opening position, in which it is moved away from an inlet of the discharge pipe, freeing it and allowing the liquid to escape through the valve and a closed position in which the valve intercepts an inlet of the discharge pipe, occluding it.

A drawback of such a valve concerns the inability to prevent the suction of air in the liquid that is sucked out of the tank in the final stage of emptying the tank, that is, when the level of the liquid to be sucked is close to running out.

Document US 2010/071123A1 describes an apparatus configured to maintain the level of a liquid in a tank, in which the apparatus comprises a ball control valve positioned horizontally at a bottom portion of the tank and adapted to verify the passage of a flow.

The purpose of the invention is to allow the aspiration of a liquid from a tank in a simple, efficient and practical way, preventing the formation of bubbles inside the liquid following the aspiration of air together with the liquid.

A further purpose of the invention is to ensure correct suction of a liquid from a tank to allow a complete emptying of the tank itself.

The specific object of the invention is a hydraulic valve connected to a bottom wall of a liquid containment tank, wherein the hydraulic valve engages a through opening delimited through the bottom wall, the hydraulic valve comprising a cage element connected to the bottom wall inside the tank, a shutter housed movable inside the cage element, in an interposed position between the cage element and the bottom wall, in which the hydraulic valve comprises a hollow connection element which engages the through opening is sealed by delimiting a passage which passes through the hydraulic valve to selectively place the tank in fluid communication with the outside according to the position of the obturator, in which the hollow connecting element comprises a portion of engagement which extends with one of its free ends into the through opening and defines a through opening which can be selectively closed by the obturator, in which the obturator is movable according to the liquid in the tank between a position distal to the free end, determining the opening of the hydraulic valve and a position of abutment against the free end of the hollow element connection, causing at least partial closure of the hydraulic valve, in which the hollow connecting element comprises radial notches which pass radially through the free end of the engagement portion and, when the shutter is near the free end, the radial notches define respective preferential passages for a liquid leaving the tank, determining the gradual closure of the hydraulic valve, avoiding the formation of vortices and a sucking of air through the hollow connection element.

According to another aspect of the invention, the radial notches can be arranged equidistant from each other according to a circular symmetry with respect to a central symmetry axis of the hollow connection element.

According to a further aspect of the invention, the radial notches can develop along the free end of the hollow connection element so as to be positioned below an internal surface of the back wall.

According to an additional aspect of the invention, the cage element is laterally delimited by a cylindrical wall, has an open bottom and a top closed by a lid, in which the lid is connected removably to the cylindrical wall or in which the lid is connected permanently to the cylindrical wall.

According to another aspect of the invention, the cylindrical wall can be crossed by a plurality of narrow and elongated shaped openings parallel to each other, the cage element acting as a filter for the passage of a liquid through it and preventing the passage of solid elements larger than a predetermined size, equal to a minimum passage section of the openings.

According to a further aspect of the invention, the connecting hollow element comprises a connecting portion opposite the engagement portion, in which the connecting portion is configured to extend outside the bottom wall so as to provide an external hydraulic connection for the tank.

According to an additional aspect of the invention, the hollow connection element can comprise a shoulder configured as an annular element which protrudes externally from the hollow connection element, the shoulder being made in an interposed position between the engagement portion and the connecting portion connection. According to another aspect of the invention, the shoulder can be positioned along the hollow connecting element so as to provide a stop for a flush positioning of the free end of the engagement portion with respect to an internal surface of the bottom wall, with the hollow connecting element in engagement in the through opening and the shoulder abutting against an external surface of the bottom wall. According to a further aspect of the invention, the shutter can be a hollow plastic ball.

According to an additional aspect of the invention, the hydraulic valve can comprise a hollow coupling insert that can be removably engaged in the hollow connection element at the free end portion, in which the hollow coupling insert delimits a central cavity through and protruding inside the tank, the hollow coupling insert has a head portion which acts as a selective abutment for the shutter in which the head portion occludes the through opening and has radial grooves which define respective channels which they keep the central through cavity in fluid communication with the inside of the tank when the shutter is in abutment against the head portion to allow a liquid introduced into the tank to be inserted below the shutter allowing its subsequent detachment relative to the hollow coupling insert during a tank filling.

According to another aspect of the invention, the hollow coupling insert can have support portions that act as a selective abutment for the shutter, in which the support portions are delimited between the radial grooves.

The advantages provided by a hydraulic valve according to the invention are evident.

The hydraulic valve according to the invention has a limited number of components and an overall simple structure that allows easy installation and implementation inside a tank.

In addition, the hydraulic valve according to the invention includes a float shutter which determines its automatic activation according to the level of the liquid contained within the tank, without requiring any type of electrical power supply for the movement of a shutter.

Furthermore, it should be noted that the hydraulic valve is configured to ensure correct operation even after repeated filling and emptying cycles of the tank in which it is installed, since it is practically free from jamming phenomena.

The present invention will: now be described, for illustrative but not limitative purposes, according to its preferred embodiments, with particular reference to the Figures of the attached drawings, in which.

Figure 1:
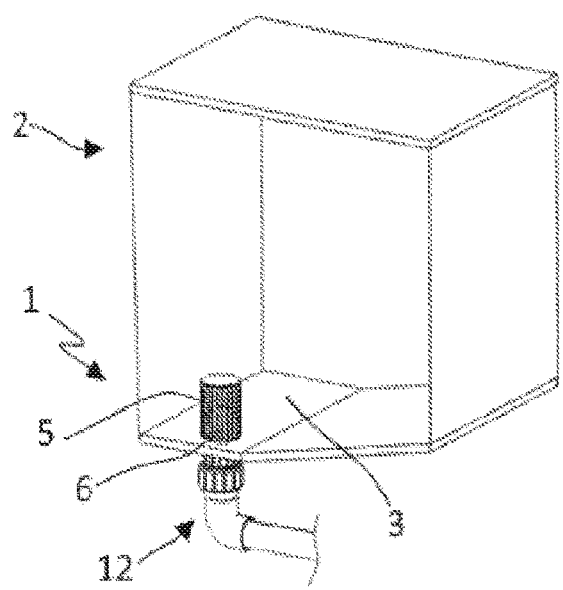
FIG. 1 shows a schematic perspective view of a tank which includes a hydraulic valve according to the invention.
Figure 2:
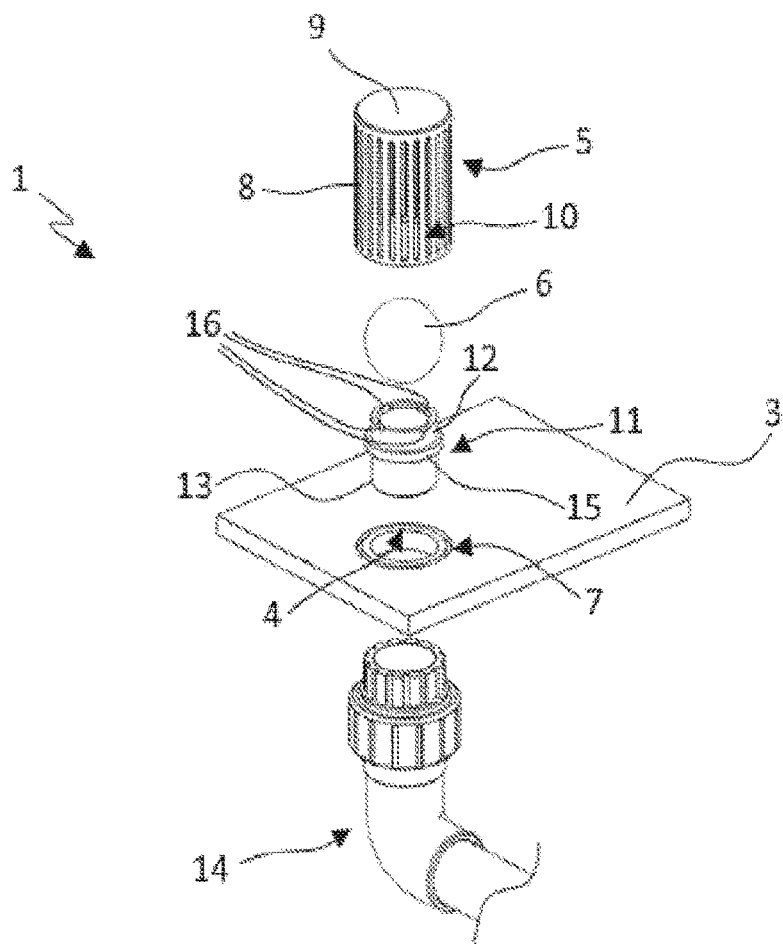
FIG. 2 shows an exploded perspective view of a hydraulic valve according to the invention.

With reference to the attached Figures, a preferred embodiment of a hydraulic valve can be observed which is wholly indicated with 1.

The hydraulic valve 1 is configured to be connected to a tank 2 and, more precisely, to a bottom wall 3 of the tank 2, at a delimited opening 4 passing through the bottom wall 3 itself to selectively free or occlude a passage through this passing through opening 4. The passing through opening 4 is circular.

A tank 2 comprising at least one hydraulic valve 1 is therefore object of the present invention.

In the attached Figures the tank 2 is shown schematically, with particular reference to the bottom wall 3 to better promote the understanding of the hydraulic valve 1 itself.

The hydraulic valve 1 comprises a cylindrical-shaped cage element 5 inside which a shutter 6 is housed which is movable between a raised position, away from the bottom wall 3 and a lowered position, near the bottom wall 3.

The shutter 6 is configured as a spherical float. More precisely, the shutter 6 is a hollow plastic ball, although it is understood that alternative embodiments are possible in which the ball can be full or made of a different material capable of floating when immersed in a liquid.

Figure 3:
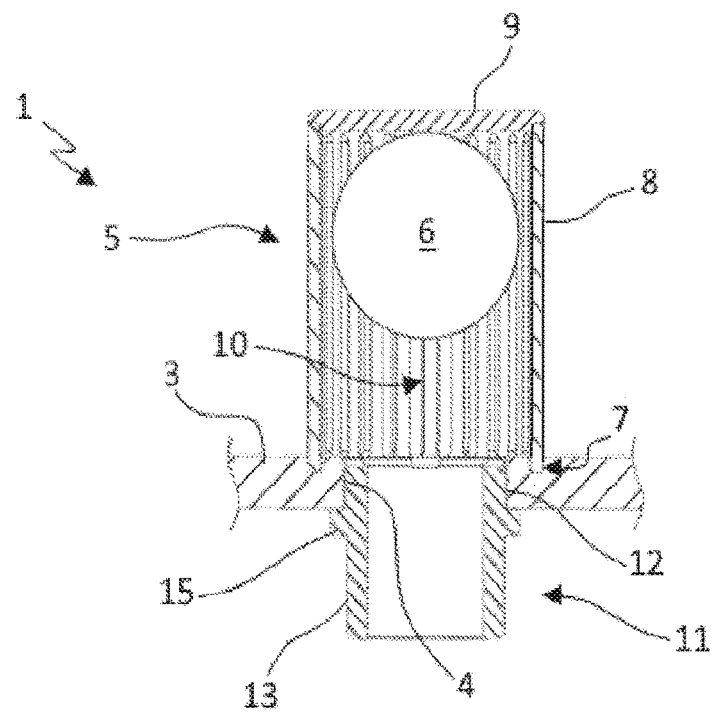
FIG. 3 shows a side sectional view of the hydraulic valve according to the invention in an opening configuration.
Figure 4:
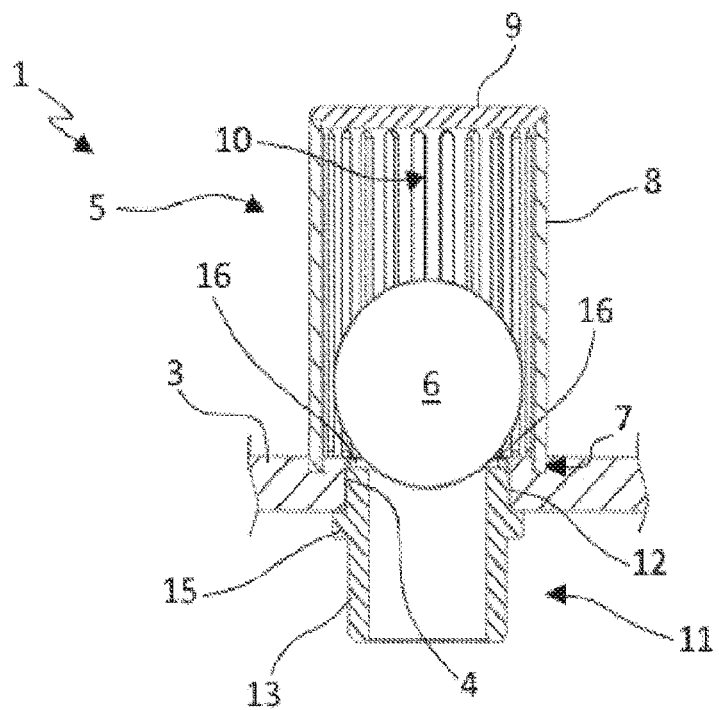
FIG. 4 shows a side sectional view of the hydraulic valve according to the invention in a closed configuration.

When the shutter 6 is in the raised position it determines the opening of a passage that develops through the hydraulic valve 1 (see FIG. 3) while when it is in the lowered position it determines the closure of this passage and, therefore, of the valve hydraulic 1 (see FIG. 4).

The cage element 5 is connected, in a removable way, to the bottom wall 3, inside the tank 2.

In particular, the cage element 5 removably engages an annular seat 7 delimited at a bottom wall 3, concentric to the passing through opening 4.

By way of non-limiting example, the cage element 5 is removably connected to the annular seat 7 via a snap or bayonet connection or with interference or via a threaded connection.

The cage element 5 is laterally delimited by a cylindrical wall 8.

The cage element 5 has an open bottom and a top closed by a lid 9. In other words, the cage element 5 is shaped like a glass or similar.

The lid 9 is removably connected to the top of the cylindrical wall 8, for example by means of a snap or interference connection.

If required, the cover 9 can be removed to access the shutter 6 located inside the cage element 5 without requiring the removal of the entire cage element 5.

It is understood that an alternative embodiment of the cage element 5 is possible wherein the cylindrical wall 8 and the lid 9 are mutually joined permanently or are made as a single body.

The cylindrical wall 8 is crossed by a plurality of openings 10 which define passages through which a liquid contained in the tank 2 can flow, so as to pass through the hydraulic valve 1.

According to a preferred embodiment, the openings 10 are shaped narrow and elongated parallel to each other, so as to define narrow passages. The cage element 5 therefore acts as a filter capable of preventing any foreign bodies or solid residues present in the liquid from accessing the inside of the hydraulic valve 1.

The hydraulic valve 1 comprises a hollow connection element 11 configured to engage the through opening 4 and provide a hydraulic connection for a pipe 12 or a pipeline or a hydraulic connection element to be connected to the tank 2.

Figure 5:
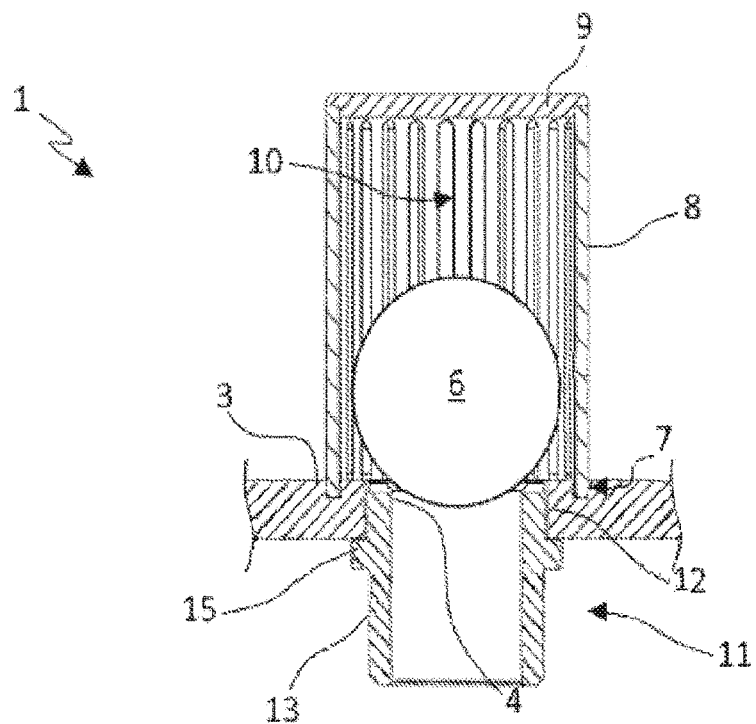
FIG. 5 shows a side sectional view of the hydraulic valve according to the invention in a partial closure configuration.

The hollow connection element 11 defines a passage that passes through the hydraulic valve 1 (see for example the sectional views shown in FIGS. 3 and 5).

The hollow connection element 11 is configured to engage the through opening 4 delimited along the bottom wall 3, on a side opposite to that engaged by the cage element 5.

The hollow connection element 11 is cylindrical and has an engagement portion 12 for sealing the through opening 4 and a connection portion 13, opposite the engagement portion 12, wherein the connection portion 13 is configured to extend outside the bottom wall 3 and provide a point for a hydraulic connection with a pipe 14 or a conduit or hydraulic connection element.

The engagement portion 12 has a free end that acts as a stop for the shutter and defines a passage opening through which the inside of the tank 2 is placed in fluid communication with the outside.

By way of example, the connection portion 13 is configured as a cylinder although it is understood that an alternative embodiment is possible, not shown in the attached Figures, in which the connection portion 13 has at least one threaded portion.

The hollow connection element 11 has a shoulder 15, configured as an annular element that protrudes externally from the hollow connection element 11, in an interposed position between the engagement portion 12 and the connection portion 13.

The shoulder 15 acts as an abutment against the bottom wall 3, to allow correct positioning of the hollow connection element 11 relative to the bottom wall 3.

In particular, the hollow connection element 11 when it is arranged in engagement with the through opening 4, with the shoulder 15 abutting against an external surface of the bottom wall 3, has the free end of the engagement portion 12 positioned flush or substantially flush with an internal surface of the bottom wall 3 (see for example FIG. 4).

The free end of the engagement portion 12, as mentioned, acts as an abutment for the shutter 6 which, therefore, does not come into contact with the bottom wall 3.

The hollow connection element 11 has a plurality of radial notches 16 which pass through radially at the free end of the engagement portion 12 and delimit the respective passageways through the engagement portion 12.

The free end of the engagement portion 12 therefore has a plurality of appendages mutually separated by the radial notches 16, in which the appendages provide abutments for the shutter 6.

According to a preferred embodiment, the hollow connection element 11 has four radial notches 16 arranged equidistant from each other according to a circular symmetry with respect to a central symmetry axis of the hollow connection element 11. It is understood that alternative embodiments of the hollow connection element 11 comprising a greater or lesser number of radial notches 16 than previously described, wherein the radial notches 16 are in any case arranged equidistant from each other according to a circular symmetry.

The radial notches 16 allow a progressive closure of the hydraulic valve 1 allowing the liquid contained in the tank 2 to escape during the final stages of emptying, so as to hinder the creation of vortices with the consequent suction of air through the hydraulic valve 1.

In particular, it should be noted that the radial notches 16 delimit preferential passages for a liquid that comes out of the tank 2, in which these passages are positioned below the internal surface of the bottom wall 3 and are open at their top end.

Obviously, the radial notches 16 delimit preferential passages for the liquid leaving the tank 2 during the approach of the shutter 6 to the free end portion of the engagement portion 12, since the shutter 6 in this configuration determines a progressive narrowing of the passage opening of the hollow connection element 11.

The hollow connection element 11 has a flare at the free end of the engagement portion 12, in which this flare extends along each of the appendages present along this free end. The flaring allows to increase the contact surface between the engagement portion 12 and the shutter 6, promoting the maintenance of the latter in position when it is lowered and against the hollow connection element 11.

In the following the operation of a hydraulic valve 1 installed at a bottom wall 3 of a tank 2, during the emptying of the tank 2 operated by suction of the liquid contained therein will be disclosed.

The shutter 6 is moved in the raised position inside the cage element 5 when the tank 2 is filled with a liquid.

The shutter 6 in the raised position is moved away from the bottom wall 3 and from the hollow connection element 11, thus freeing the passage opening centrally delimited in the latter and placing the hydraulic valve 1 in the open configuration.

With the hydraulic valve 1 in the open configuration, the liquid advances by gravity through the hollow connection element 11, resulting in the emptying of the tank 2 and the lowering of the free surface of the liquid contained within it.

The shutter 6 is kept in a completely raised position, i.e. with the shutter 6 abutting against the lid 9 of the cage element 5, as long as the free surface of the liquid inside the tank 2 is such as to determine the floatation of the shutter 6 in this position. The progressive emptying of the tank 2 determines the lowering of the shutter 6 inside the cage element 5.

It should be noted that the emptying of the tank 2 can occur by means of a depression caused downstream of a hydraulic circuit connected to the pipe 14, not illustrated in the attached Figure, which, in turn, is connected to the hydraulic valve 1 through the hollow connection element 11, as better described below.

Following the emptying of the tank 2 there is a lowering of the free surface of the liquid inside the tank 2 itself and, consequently, a lowering of the shutter 6 inside the cage element 5, away from the cover 9 and approaching the free end of the engagement portion 12 of the hollow connection element 11.

In the final stages of emptying the tank 2, in which the free surface of the liquid inside the tank is in close proximity to the bottom wall 3, the shutter 6 approaches the free end of the engagement portion 12, progressively reducing the free section for the passage of liquid through the hydraulic valve 1.

The shutter 6, during its descent, acts as a cap, preventing the air present in the tank from accessing the passage opening defined along the hollow connection element 11 and allowing the liquid contained in the tank 2 to pass through a bottom side portion of the cage element 5.

The further approach of the shutter 6 to the free end of the engagement position 12 tends to occlude the passages delimited between the shutter 6 itself and the appendages which protrude from the free end of the engagement portion 12 and to guide the flow of the liquid at the outlet along the passages defined by the radial notches 16 (see the sectional view of FIG. 5).

This configuration is determined by a minimum presence of liquid inside the tank 2 able to keep the shutter 6 slightly raised with respect to the bottom wall 3 and, in particular, with respect to the hollow connection element 11.

In this configuration, as mentioned, the radial notches 16 delimit preferential passages for the liquid which tends to fill them, preventing the passage of air through them.

Figure 6:
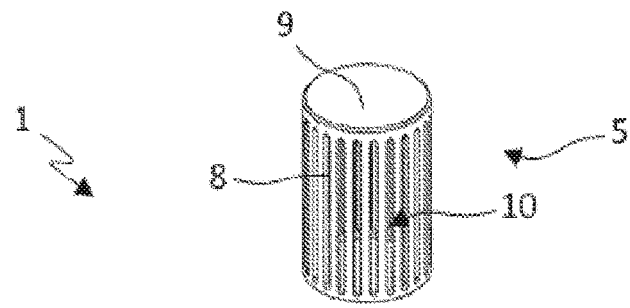
FIG. 6 shows an exploded perspective view of some components of the hydraulic valve according to the invention.
Figure 6:
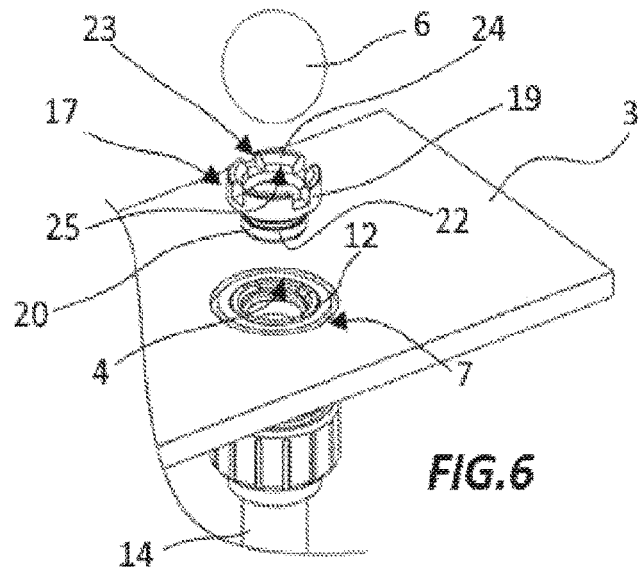

The subsequent emptying of the tank 2 determines the further lowering of the shutter 6 which encounters against the hollow connection element, occluding its central opening and the openings delimited by the radial notches 16, causing the closure of the hydraulic valve 1 (see, for example, FIG. 6).

Figure 7:
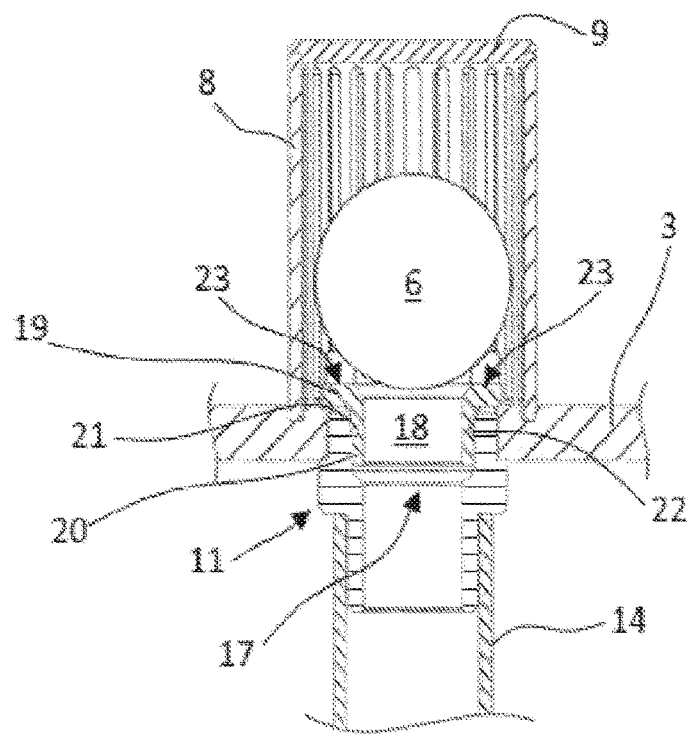
FIG. 7 shows a side sectional view of the hydraulic valve of FIG. 6, in the closed configuration.
Figure 8:
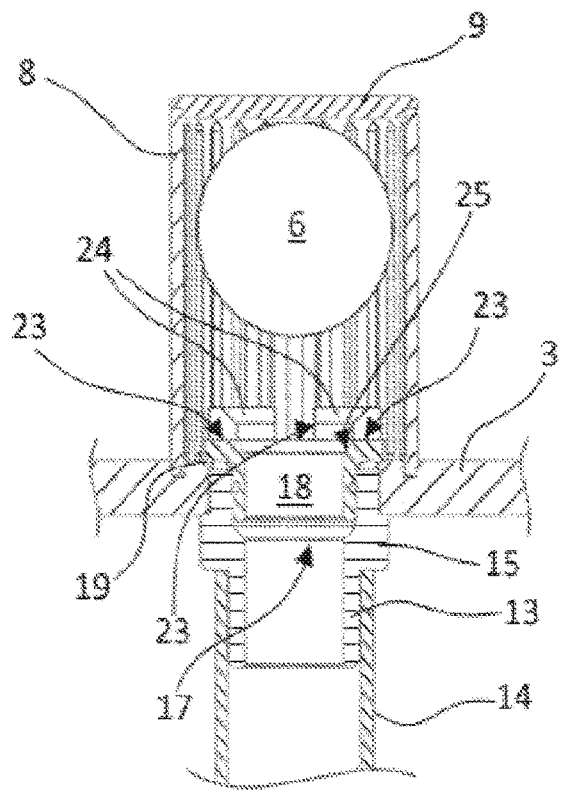
FIG. 8 shows a side sectional view of the hydraulic valve of FIG. 6, in the open configuration.

Optionally, the hydraulic valve 1 comprises a hollow coupling insert 17 that can be removably engaged in the hollow connection element 11, at the free end portion of the engagement portion 12 (see FIGS. 6-8).

The hollow coupling insert 17 acts as a selective abutment for the shutter 6 for the purposes that will be described below. The hollow coupling insert 17 is used when the hydraulic valve 1 is operatively connected to a suction circuit, not shown in the attached FIGS. According to this configuration, the outflow of the liquid from the tank 2 is selectively controlled by means of a vacuum through the pipe 14 to which the hydraulic valve 1 is connected in fluid communication and the hollow coupling insert 17 is configured to maintain at least one passage opening minimum relative to the shutter 6 to allow the detachment of the shutter 6 during a filling phase subsequent to a phase of complete emptying of the tank 2.

The hollow coupling insert 17 has a central passing through cavity 18 to allow the passage of the sucked liquid through the hollow coupling insert 17 and the hollow connection element 11 to which it is connected (see FIGS. 7 and 8). The hollow coupling insert 17 has a circular symmetry and a circular footprint.

Preferably, the hollow coupling insert 17 has an external diameter greater than the diameter of the through opening 4 in order to occlude it, for the purposes that will be described below.

The hollow coupling insert 17 has a head portion 19, configured annular or substantially annular, and a coupling portion 20 that protrudes from a bottom of the head portion 19.

The head portion 19 is configured to act selectively as an abutment to the shutter 6, depending on the position assumed by the shutter 6 itself inside the cage element 5.

The coupling portion 20 is configured to engage the free end of the top of the engagement portion 12 of the hollow connection element 11, thus allowing the reciprocal connection between the hollow coupling insert 17 and the hollow connection element 11. The coupling portion 20 is cylindrical and has a smaller external diameter than that of the head portion 19.

Following the engagement of the coupling portion 20 in the hollow connection element 11, the head portion 19 abuts against the free end of the engagement portion 12 of the hollow connection element 11, constraining the hollow coupling insert 17 in position.
The head portion 19 occludes the central opening 4 and the radial notches 16 on which it is positioned.

The hollow coupling insert 17 has a sealing seat 21 delimited along the coupling portion 20, configured to at least partially house an annular sealing element 22, preferably an O-ring or an annular gasket, so that a portion of this annular sealing element 22 extends outside the coupling portion 20 defining a seal for the connection between the hollow coupling insert 17 and the hollow connection element 11.

The hollow coupling insert 17 has radial grooves 23 that partially extend through the head portion 19.

The radial grooves 23 define respective channels which extend through the head portion 19 and are in fluid communication with the central passing through cavity 18.

The hollow coupling insert 17 shown in the attached FIGS. 6-8 has four radial grooves 23 arranged equidistant from each other according to a circular symmetry with respect to a central symmetry axis of the hollow coupling insert 17. It is understood that alternative embodiments of the hollow coupling insert 17 comprising a greater or lesser number of radial grooves 23 than previously described, wherein the radial grooves 23 are in any case arranged equidistant from each other according to a circular symmetry.

The hollow coupling insert 17 therefore has at the head portion 19 support portions 24 delimited between the radial grooves 23.

The support portions 24 provide an abutment for the shutter 6, when this is not supported by any liquid inside the tank 2.

It should be noted that the radial grooves 23 extend partially through the head portion 19, starting from a top of the head portion 19 itself and ending before a bottom of the head portion 19 itself.

As mentioned, the hollow coupling insert 17 is crossed by a central passing through cavity 18 which defines an inlet opening 25 at the top of the head portion 19.

The inlet opening 25 is flared to promote at least partial housing of the shutter 6.

It should be noted that the hollow coupling insert 17 is configured to maintain at least one passageway when the shutter 6 is fully supported at the head portion 19, as shown in the attached FIG. 7.

In practice, when there is a hollow coupling insert 17 in engagement along the hollow connection element 11, the hydraulic valve 1 is unable to ensure a tight seal.

The hollow coupling insert 17 keeping the shutter 6 in a spaced position with respect to the central passing through cavity 18 guarantees the detachment of the shutter 6 itself after emptying the tank 2.

During the filling of the tank 2, previously emptied, the liquid is able to enter the central passing through cavity 18 through the radial grooves 23, inserting itself below the shutter 6 in order to then be able to lift it and move it away from the hollow coupling insert during the further tank filling 2.

In the absence of these radial grooves 23, the shutter 6, following the emptying of the tank 2, would completely occlude the opening delimited at the head portion 19 of the hollow coupling insert 17 and would be kept in position by the depression present along the suction branch connected to the hydraulic valve 1. The shutter 6 thus kept in position would not be able to rise during a subsequent filling of the tank 2, causing the hydraulic valve 1 to jam.

The radial grooves 23 perform the same function as the radial slots 16 in relation to the possibility of preventing the formation of vortices at the hydraulic valve 1 and therefore the intake of air inside the hydraulic valve 1 itself and the liquid sucked through it.

With reference to what has been described, it is evident that the hydraulic valve 1 according to the invention is able to achieve the intended purposes.

The radial notches 16 delimited in the hydraulic valve 1 define respective ports for the passage of liquid in the final stages of emptying the tank 2, through which the passage of the liquid that is sucked through the hydraulic valve 1 is allowed, preventing the intake of air which is inhibited by the shutter 6.

The hydraulic valve 1, therefore, allows to avoid the aspiration and mixing of air in a liquid that is sucked out from a tank 2, thus overcoming a drawback that afflicts traditional solutions.

In the foregoing, the preferred embodiments have been described and variants of the present invention have been suggested, but it is to be understood that those skilled in the art will be able to make modifications and changes without thereby departing from the relative scope of protection, as defined by the attached claims.

What is claimed is:

1. A hydraulic valve connected to a bottom wall of a tank for containing a liquid, wherein said hydraulic valve engages a through opening delimited through said bottom wall, said hydraulic valve comprising a cage element connected to said bottom wall inside said tank, a shutter movable housed inside said element cage, in an interposed position between said cage element and said bottom wall, wherein said hydraulic valve comprises a hollow connection element which hermetically engages said through opening delimiting a passage which passes through said hydraulic valve to selectively place said tank in fluid communication with the outside according to the position of said shutter, wherein said hollow connection element includes an engaging portion which extends with a free end in said through opening and defines a passage opening to be selectively occluded by said shutter, wherein said shutter is movable according to the liquid in said reservoir between a position distal to said free end causing the opening of said hydraulic valve and a position of abutment against said free end, causing at least partial closure of said hydraulic valve, wherein said hollow connection element comprises radial notches which pass radially through said free end and, when said shutter is in proximity to said free end, said radial notches define respective passages for a liquid sucked out of said tank determining the gradual closure of said hydraulic valve and avoiding the formation and of vortices and a suction of air through said hollow connection element.

2. The hydraulic valve according to claim 1, wherein said radial notches are arranged equidistant from each other according to a circular symmetry with respect to a central symmetry axis of said hollow connection element.

3. The hydraulic valve according to claim 1, wherein said radial notches extend along said free end of said hollow connecting element so as to be positioned below an internal surface of said bottom wall at said through opening.

4. The hydraulic valve according to claim 1, wherein said cage element is laterally delimited by a cylindrical wall, has an open bottom and a top closed by a lid, wherein said lid is removably connected to said cylindrical wall or wherein said lid is permanently connected to said cylindrical wall.

5. The hydraulic valve according to claim 4, wherein said cylindrical wall is crossed by a plurality of narrow and elongated shaped openings parallel to each other, said cage element acting as a filter for the passage of a liquid through it and preventing the passage of solid elements larger than a predetermined dimension, equal to a minimum passage section of said openings.

6. The hydraulic valve according to claim 1, wherein said connection hollow element comprises a connection portion opposite to said engagement portion, wherein said connection portion is configured to extend outside said bottom wall so as to provide an external hydraulic connection for said tank.

7. The hydraulic valve according to claim 6, wherein said connecting hollow element comprises a shoulder configured as an annular element extending externally from said connecting hollow element, said shoulder being made in an interposed position between said engagement portion and said connection portion.

8. The hydraulic valve according to claim 6, wherein said connecting hollow element comprises a shoulder configured as an annular element extending externally from said connecting hollow element, wherein said shoulder is positioned along said hollow connecting element so as to provide a stop for a flush positioning of said free end of said engagement portion with respect to an internal surface of said bottom wall, with said hollow connection element in engagement in said through opening and said shoulder abutting against an external surface of said bottom wall.

9. The hydraulic valve according to claim 1, wherein said shutter is a hollow plastic ball.

10. The hydraulic valve according to claim 1, comprising a hollow coupling insert removably engageable in said hollow connection element, at said free end, wherein said hollow coupling insert delimits a central passing through cavity and has a head portion which acts as a selective abutment for said shutter, said head portion occluding said through opening and having radial grooves which define respective channels which maintain said central passing through cavity in fluid communication with the interior of said tank when said shutter is abutting against said head portion, to allow a liquid introduced into said tank to be inserted below said shutter allowing said shutter subsequent detachment relative to said hollow coupling insert.

11. The hydraulic valve according to claim 10, wherein said hollow coupling insert has support portions which act as a selective abutment for said shutter, wherein said support portions are delimited between said radial grooves.

* * * * *